United States Patent [19]

Asbra et al.

[11] Patent Number: 4,979,528
[45] Date of Patent: Dec. 25, 1990

[54] GAS ACTUATED VALVE SYSTEM

[75] Inventors: Martin R. Asbra, 2475 Butternut Drive, Hillsborough, Calif. 94010; Andrew F. Asbra, San Mateo; Nicholas J. Bovis, Burlingame, both of Calif.

[73] Assignees: Andrene Associates; Martin R. Asbra, both of Burlingame, Calif. ; a part interest

[21] Appl. No.: 507,496

[22] Filed: Apr. 11, 1990

Related U.S. Application Data

[63] Continuation-in-part of Ser. No. 387,579, Jul. 31, 1989, Pat. No. 4,920,999, which is a continuation-in-part of Ser. No. 254,872, Oct. 7, 1988, Pat. No. 4,852,600.

[51] Int. Cl.⁵ ............................................. F16K 17/36
[52] U.S. Cl. ............................................ 137/38; 137/46
[58] Field of Search ............................... 137/38, 39, 46

[56] References Cited

U.S. PATENT DOCUMENTS

| | | | |
|---|---|---|---|
| 3,043,321 | 7/1962 | Hewitt | 137/46 |
| 3,089,512 | 5/1963 | Julien | 251/29 X |
| 3,948,478 | 4/1976 | Vind | 251/29 |
| 4,007,906 | 2/1977 | Karpenko | 251/26 |
| 4,094,332 | 6/1978 | Poff | . |
| 4,174,729 | 11/1979 | Roark | 137/557 |
| 4,197,867 | 4/1980 | Roger | . |
| 4,503,717 | 3/1985 | Keller | . |
| 4,852,600 | 8/1989 | Asbra | 137/38 |
| 4,920,999 | 5/1990 | Asbra | 137/38 |

Primary Examiner—Robert G. Nilson
Attorney, Agent, or Firm—Donald Diamond

[57] ABSTRACT

A gas actuated valve system includes a gas switch disposed in a primary gas circuit upstream of a gas driven actuator. The switch is movable to an open position when a pilot gas is supplied under pressure to the gas switch through a pilot circuit, and is movable to a closed position when the pilot pressure is released. A seismic valve coupled to the pilot circuit senses seismic activity and releases pilot gas pressure, thus moving the gas switch to the closed position, when seismic activity is detected.

7 Claims, 9 Drawing Sheets

GAS ACTUATED VALVE SYSTEM

CROSS REFERENCE TO RELATED APPLICATION

This is a continuation-in-part of U.S. Ser. No. 387,579, filed July 31, 1989, now U.S. Pat. No. 4,920,999 which is a continuation-in-part of U.S. Ser. No. 07/254,872, filed Oct. 7, 1988, now U.S. Pat. No. 4,852,600.

BACKGROUND OF THE INVENTION

1. Field of the Invention

The present invention relates generally to fluid actuated valve systems, and more particularly to an air actuated valve system having an integrated seismic control circuit.

2. Description of the Related Art

Seismic valves which are used to shut off fluid flow upon experiencing a predetermined level of seismic activity are generally known. Where there is a high probability of seismic disturbances, such as earthquakes, seismic valves are necessary to prevent the release of hazardous and/or flammable substances such as natural gas and LPG.

One such seismic valve is described in U.S. Pat. No. 4,745,939 to Greer et al. The seismic valve is a pin supported gate valve having a gas-tight reset system. The seismic sensing component of the valve actuates shut off means when subjected to a predetermined amount and type of horizontal sinusoidal oscillation.

Although the seismic valve described above is effective for shutting off fluid flow, the valve is normally installed in a gas line between a meter and an associated structure. Due to the placement of the seismic valve directly in the fluid conduit, limitations are imposed upon the size of the conduit and the type of materials handled by the conduit.

SUMMARY OF THE INVENTION

An object of the present invention is to provide a gas actuated valve system having a shut off valve which is actuated by a seismic activity.

Another object of the present invention is to control a shut off valve disposed in a fluid conduit with a seismically actuated air switch.

In a preferred embodiment, an air actuated valve system for shutting off fluid flow in fluid conduit includes a fluid shut off valve for placement in the fluid conduit, an air driven actuator, connected to the fluid shut off valve, for moving the fluid shut off valve between open and closed positions, a primary air circuit, in fluid communication with the air driven actuator, for supplying air to the air driven actuator at a pressure sufficient to maintain the fluid shut off valve in the open position, an air switch disposed in the primary air circuit upstream of the air driven actuator and being movable between open and closed positions, and seismic control means, connected to the air switch, for shutting off air to the air driven actuator in response to a predetermined level of seismic activity.

Preferably, the seismic control means includes a seismic air circuit, in fluid communication with the primary air circuit and the air switch, for supplying air to the air switch at a pressure sufficient to maintain the air switch in the open position, and a seismic valve disposed in the seismic air circuit for shutting off air supplied to the air switch in response to a predetermined level of seismic activity, thereby causing the air switch to close and thus the shut off valve to close.

In another aspect of the present invention, a gas actuated valve system for shutting off fluid flow in a fluid conduit includes a source of a pressurized gas, a fluid shut off valve for placement in the fluid conduit, a gas driven actuator connected to the fluid shut off valve for moving the fluid shut off valve between open and closed positions, a primary gas circuit in fluid communication with the gas driven actuator, for supplying gas from the gas source to the gas driven actuator at a pressure sufficient to maintain the fluid shut off valve in the open position, a gas switch disposed in the primary gas circuit upstream of the gas driven actuator and being movable to an open position when a pilot gas is supplied under pressure to the gas switch through a pilot circuit, and to a closed position when the pilot pressure is released, and seismic means coupled to the pilot circuit for sensing seismic activity and releasing pilot gas pressure, thus moving the gas switch to the closed position, when seismic activity is detected.

These objects, together with other objects and advantages which will be subsequently apparent reside in the details of construction and operation of the gas actuated valve system as more fully hereinafter described and claimed, reference being had to the accompanying drawings forming a part hereof, wherein like reference numerals refer to like parts throughout.

DETAILED DESCRIPTION OF THE PREFERRED EMBODIMENTS

Figure 1:
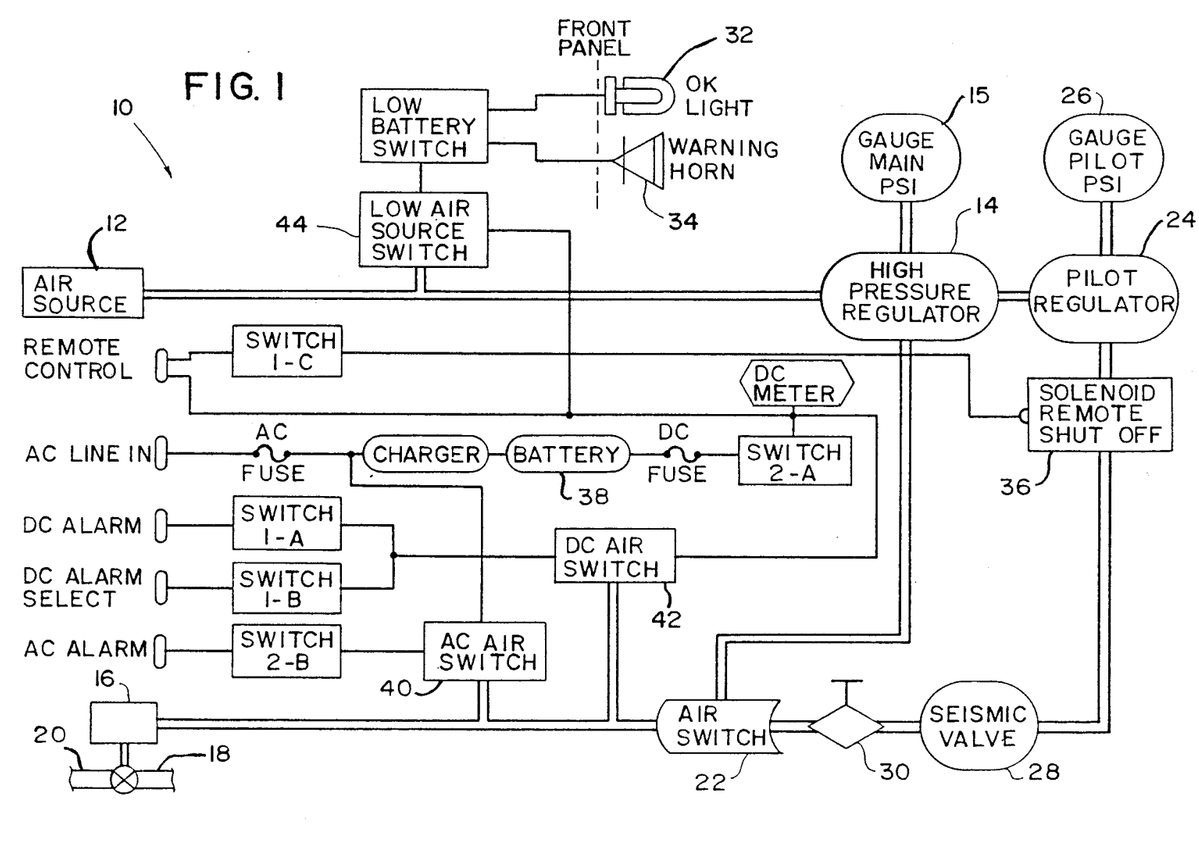
FIG. 1 is a schematic view of an air actuated valve system according to the present invention.

Referring to FIG. 1, an air actuated valve system according to the present invention is generally referred to by the numeral 10. The system 10 includes an air source 12, such as an air compressor and storage tank. The air compressor is selected to provide a continuous air supply of about 100–200 psi. This pressure is regulated by a high pressure regulator 14 to reduce the pressure from the air source 12 to about 80–100 psi. Compressed air, preferably at about 90 psi is continuously supplied through pneumatic conduit from the air source 12, through the regulator 14 to an air driven actuator 16 coupled to a fluid shut off valve 18 movable in a fluid conduit 20.

The air driven actuator 16 is of a spring-return type in which air pressure coming into the actuator opposes a spring force which normally biases the valve 18 in a closed position. When air enters the actuator 16 at a sufficient level of pressure to overcome the spring force, an element, such as a shaft, within the actuator 16 is driven by the air pressure to rotate or otherwise move the valve 18 from a closed position to an open position. Thus, as long as the actuator 16 is supplied with air at a pressure level sufficient to overcome the spring force, the fluid shut off valve 18 will be maintained in an open position. When the air pressure is removed, the valve 18 closes due to the spring force. Air driven actuators of this type are generally known and commercially available. An example is a series 39 spring-return actuator sold by Worcester Controls, Marlborough, Mass.

The high pressure regulator 14 is equipped with a gauge 15 which is used to monitor the regulated air pressure.

The air source 12, the high pressure regulator 14 and the pneumatic conduit which connects the air source and regulator to the air actuator 16 constitute a primary air circuit which communicates air from the source 12 to the air driven actuator 16 at high pressure. An air switch 22, which acts as a control valve, is disposed in the primary air circuit upstream of the air driven actuator 16 and downstream of the high pressure regulator 14. The air switch 22 is movable between open and closed positions by seismic control means which shuts off air to the air driven actuator 16 in response to a predetermined level of seismic activity. Basically, the seismic control means actuates the air switch 22, shutting off the supply of air in the primary air circuit to the air driven actuator 16.

The seismic control means includes a seismic air circuit, in fluid communication with the primary air circuit, which receives air from the high pressure regulator 14 and delivers a "pilot" air pressure to the air switch 22. A low pressure regulator or pilot regulator 24 reduces the pressure in the seismic air circuit to about 10–15 psi. A gauge 26 is coupled to the pilot regulator to facilitate monitoring of pilot pressure.

A seismic valve 28 allows pilot air pressure to flow through pneumatic conduit to the air switch 22. In the presence of a predetermined level of seismic activity, the seismic valve is actuated to shut off the flow of pilot air to the air switch 22, thereby causing the air switch to switch from an ON position to an OFF position to prevent air in the primary air circuit from flowing to the air actuator 16. A bleed port 30 is disposed between the seismic valve 28 and the air switch 22 such that when the seismic valve closes, the bleed port 30 depletes the pilot pressure applied to the air switch 22, thereby de-activating the air switch which, in turn, shuts off the shut off valve 18.

An optional electrical component of the system includes a warning indicator which indicates failure of an external air supply or air compressor. The reserve in the air source 12, such as an air tank will gradually decrease due to the small bleed port 30. An OK light 32 is illuminated on a front panel so long as sufficient air pressure remains in the primary air circuit. The air actuator 16 can continue to hold the shut off valve 18 in an open position until the pressure drops to a predetermined level as, for example, 70±30 psi. Therefore, the front panel includes an optional warning horn 34 which sounds when pressure drops below a predetermined threshold level. Since it may take about one hour for pressure to fall to a predetermined level, this will enable the operators to have sufficient time to correct the malfunctioning air source.

The optional electrical component of the system provides local and remote alarms both AC and DC powered, and separate indicators notify that the system is operational, or has a fault, such as low air supply or low battery.

A manual solenoid remote shut off 36 is coupled to a remote control circuit so as to provide a manual remote control shut off capability.

The electrical component further includes a trickle-charged storage battery 38, air pressure switches 40, 42 and 44, toggle switches 1-A, 1-B, 2-A, and 2-B which provide alarm control and DC power, and indicator lamps and horns for actuation of warning signals and indicating system status.

Any fault in the optional electrical circuit, including complete power loss, will not effect the pneumatic operation of the system. An operational alarm connection may be made to the security or night alarm system of the installation site. Also, assuming system activation due to earthquake or nearby explosion, the alarms may be shut off by moving toggle switches to their OFF position according to the following table.

TABLE 1

| FUNCTION | | 1-A DC ALARM | 1-B SELECT DC ALARM | 1-C REMOTE CONTROL | 2-A DC POWER | 2-B AC ALARM |
|---|---|---|---|---|---|---|
| TOGGLE | TOP | ON | ON | ON | ON | ON |
| SWITCH | CENTER | OFF | OFF | OFF | OFF | OFF |
| POSITIONS | BOTTOM | ON | OFF | ON | ON | ON |

When resetting the system after a seismic event, it is preferable to first perform a damage and leak check of the protective area. Then, the seismic valve is reset by pulling upward on a reset ring and then down to reset the gate/actuator on its pin at the top of the chamber. This structure is fully described in U.S. Pat. No. 4,745,939, which is incorporated herein by reference.

Figure 2:
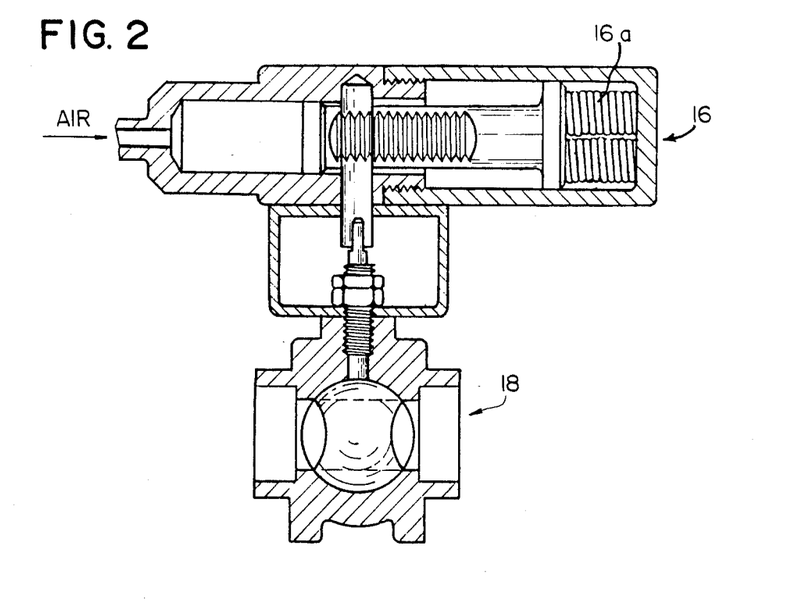
FIG. 2 is a schematic, cross-sectional view, illustrating an air driven actuator used in the system of claim 1.

An example of an air driven actuator 16 and shut off valve 18 is illustrated in FIG. 2. Air under high pressure enters the actuator 16 from one end thereof and, through a gear mechanism, causes a ball element of a ball valve to rotate to the open position illustrated in FIG. 2. The gear mechanism is a piston-actuated rack and pinion gear system which produces a torque for rotating the valve. A spring 16a opposes piston movement imparted by air pressure such that when air pressure is removed, the spring causes the piston to return to its original position in which the ball valve is in a closed state. Any other type of air actuator and valve combination can be used so long as a spring-return mechanism causes the valve to close when air is removed. Such an alternative embodiment may include a pneumatic actuator which has a piston-type assembly wherein a cam-shaped layer is driven by a piston-operated slide to produce a torque for rotating a valve through its opening and closing cycles. This type of actuator is available from Worcester Controls. Moreover, the pneumatic actuator 16 may be used in combination with diverse types of valves such as ball valves, butterfly valves, gate valves, etc.

Figure 3A:
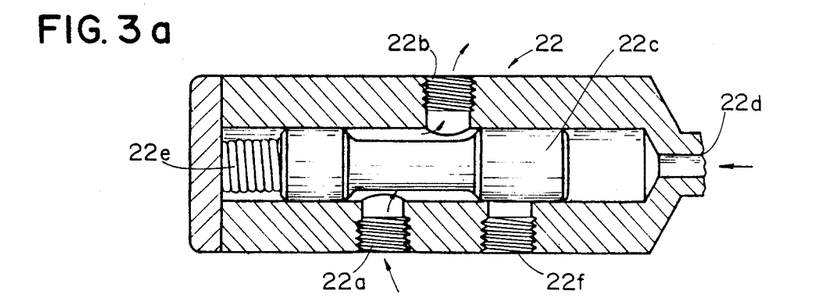
FIGS. 3a and 3b are schematic, cross-sectional views illustrating an air switch used in the system of FIG. 1 in the open and closed positions, respectively;.
Figure 3B:
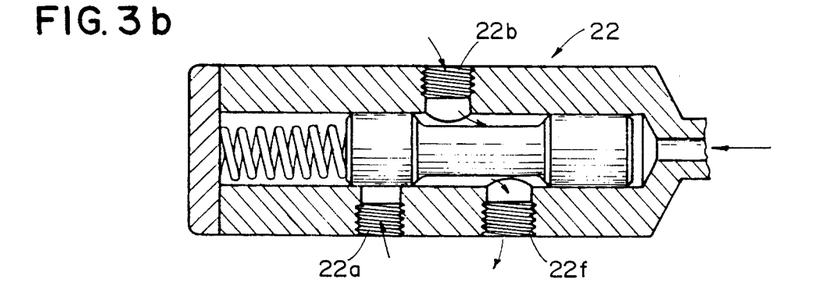

FIGS. 3a and 3b illustrate an exemplary air switch 22, which is in an open position in FIG. 3a and closed in FIG. 3b. Referring to FIG. 3a, air from the primary air circuit, at a relatively high pressure, enters an inlet 22a of the air switch 22 and passes through an outlet 22b to the air driven actuator 16. In order for this to occur, a piston 22c is driven from right to left by pilot air pressure from the seismic air circuit which enters the air switch 22 from a right hand side at 22d. A spring 22e opposes movement of the 22c such that when the pilot air pressure is removed, such as when the seismic valve is actuated, the spring 22e returns the piston to its normally closed position illustrated in FIG. 3b. This piston 22c has two enlarged portions, one of which seats over the inlet 22a when the piston is in its original position shown in FIG. 3b. An exhaust port 22f, which is closed in FIG. 3a, becomes open when the spring returns the piston. Thus, incoming air under high pressure is blocked at the inlet 22a, and air downstream of the air switch 22 bleeds back through the air switch out the exhaust port 22f. This type of air switch is available from Numatics of Highland, Mich.

In the system described above, a vent 30 is provided between the seismic valve 28 and the air switch 22. Although this type of arrangement is functionally adequate, it can provide a leakage of air pressure such that the air source 12 must be periodically operated to maintain sufficient pressure in the lines.

An alternative vent structure is illustrated in FIGS. 4-11, in which the vent is provided in a closed loop so that, until the seismic valve is actuated, the vent is closed.

Figure 4:
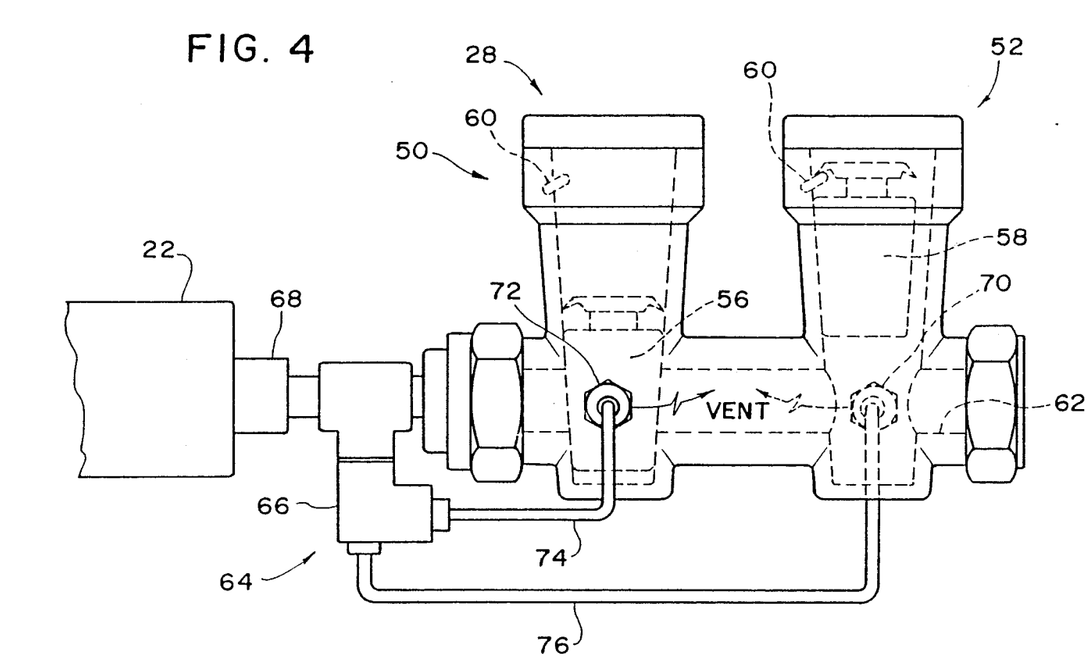
FIG. 4 is a schematic view of a seismic valve including a venting assembly according to another aspect of the present invention.

Referring to FIG. 4, the seismic valve 28 is a shock actuated shut-off valve for fluid, and has two valve assemblies 50 and 52. Each valve assembly has a valve element 56 and 58, each of which is supported in the upper part of a chamber on a support 60. In the presence of sufficient seismic activity, the valve element is dislodged from its support and falls into the lower part of its corresponding chamber to block the flow of air through a common line 62.

The seismic valve is described in greater detail in U.S. Pat. No. 4,745,939, which is incorporated herein by reference.

A venting valve assembly 64 is disposed between the air switch and the seismic valve for venting air automatically when the seismic valve is actuated. The venting valve assembly includes a coupling 66 in fluid communication with the pneumatic conduit 68 which connects the air switch 22 to the seismic valve 28, venting valves 70 and 72 associated with the seismic valve, and vent lines 74 and 76 connecting the venting valves to the coupling 66. The venting valves 70 and are actuated by the valve elements 56 and 58 of the seismic valve 28. This actuation is described in detail with references to FIGS. 5-11.

Figure 5:
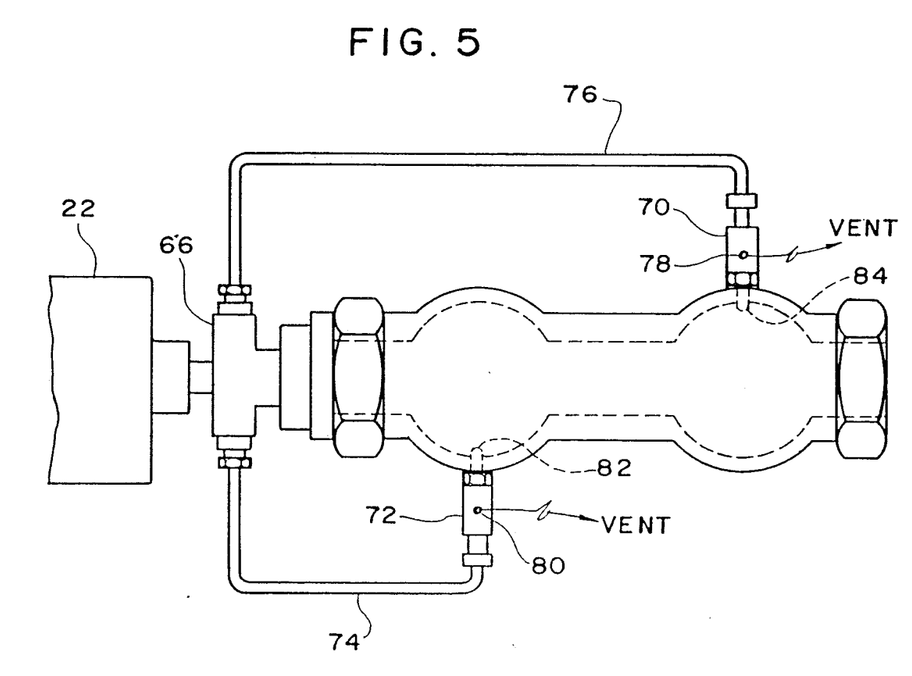
FIG. 5 is a top view of a seismic valve showing additional details of the venting system.

In FIG. 5, a slight variation of the coupling 66 is illustrated, in which a T-joint is provided so that air in the line between the air switch 22 and seismic valve 28 is fed through lines 74 and 76 to the respective venting valves 70 and 72. Each venting valve has a vent port 78 and 80 which release air from the line between the seismic valve 28 and air switch 22 upon actuation of the seismic valve. Each venting valve has a protruding element 82 and 84 which extends into the inner chamber of each valve assembly in a lower portion of the chamber so that when the valve element falls due to seismic activity, the outer wall of the valve element pushes the protruding elements 82 and 84 inwardly to cause the air in lines 74 and 76 to vent to the atmosphere.

Figure 6:
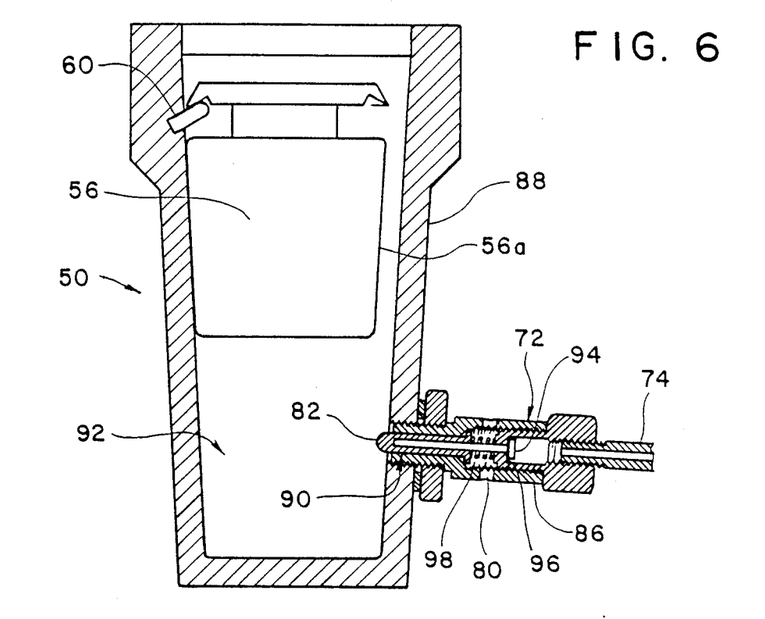
FIG. 6-13 are sectional views showing various embodiments of a venting valve according to the present invention.

FIG. 6 is a detailed view of one valve assembly 50 in the non-actuated position, with the valve element 56 in its normal, unactuated state in which it is hung on the support 60. The venting valve 72 includes a body 86 having one end threadedly engaging a threaded bore of the seismic valve body 88 and an opposite end to which the venting line 74 is connected. A central passageway extends between the two opposite ends. A valve stem 90 is movably mounted in the central passage way of the valve body 86 and has one end which extends into the chamber 92 of the valve assembly 50. This protruding end has been previously referred to as protruding member 82. The opposite end of the valve stem is provided with a valve 94 which is normally seated on a valve seat 96 so that air in the line 74 is blocked and thus not vented. A spring 98 biases the valve stem and valve 94 into the seated position on the valve seat 96.

Figure 7:
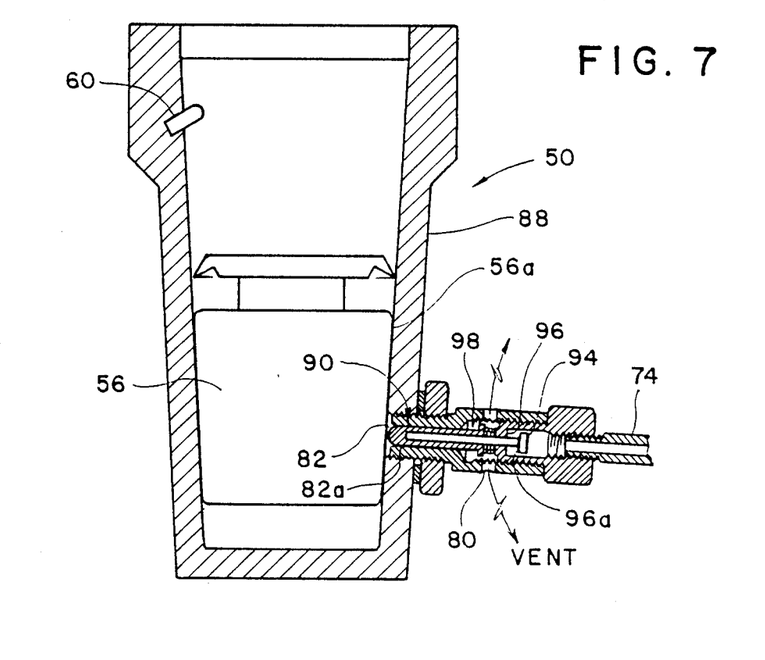

Now referring to FIG. 7, after sufficient seismic activity has dislodged the valve element 56 of the valve assembly 50 the outer sidewall 56a of the valve element 56 pushes the protruding end 82 of the venting valve 72 to the right in FIG. 7, thus lifting the valve 94 off its valve seat 96, and thereby allowing air in line 74 to vent through the vent port 80.

Figure 8:
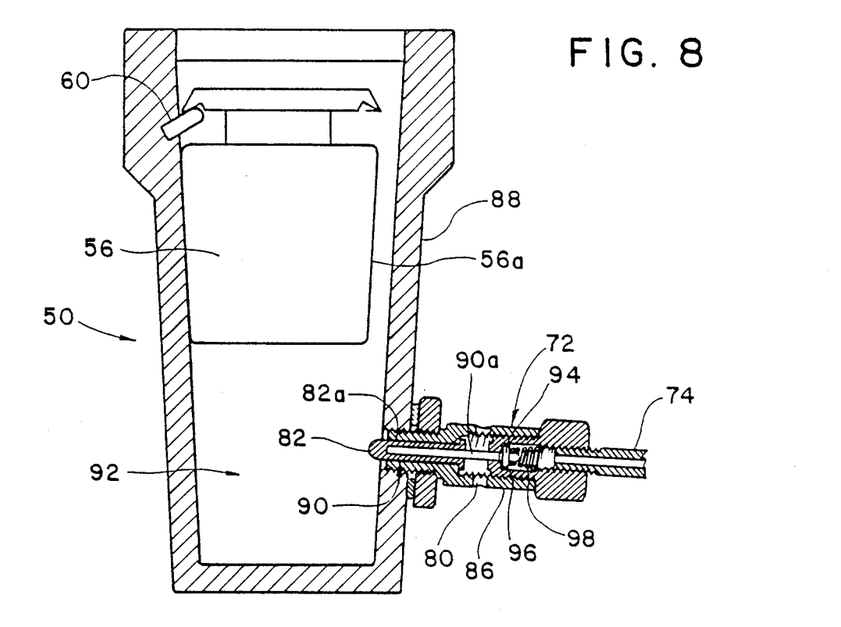
Figure 9:
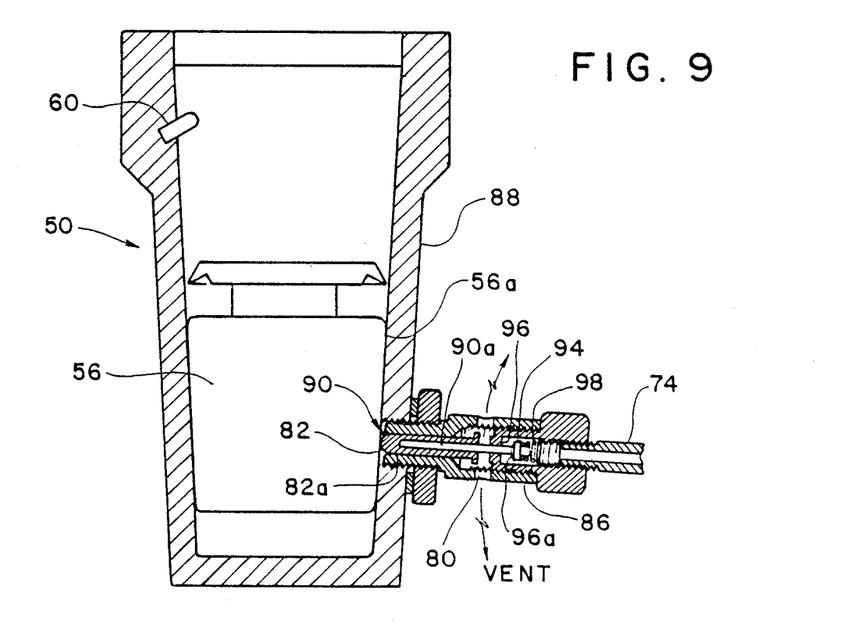

A slightly different embodiment of the venting valve is illustrated in FIGS. 8 and 9, in which the venting valve 72 includes all the same features as stated, except that the spring 98 is disposed on the opposite side of the valve 94, and the valve seat 96 includes an elastomeric seal 96a which helps prevent inadvertent venting of air. Also, the vent port 80 passes through opposite sides of the body 86 to provide two vent ports. In addition, the valve stem 90 includes a separate abutment portion 82a which has an axial bore in which a stem portion 90a is loosely fitted. A valve member 94 is made as a separate element which is held on one end of the stem portion 90a by an interference fit, or other suitable means.

FIG. 9 is identical to FIG. 8 except that the valve is in the actuated state, in which the protruding portion 82a is pushed inwardly into the venting valve body 86, thereby lifting the valve 94 off the valve seat 96. With the valve 94 unseated, air within lines vents to the atmosphere through the vent ports 80.

Figure 10:
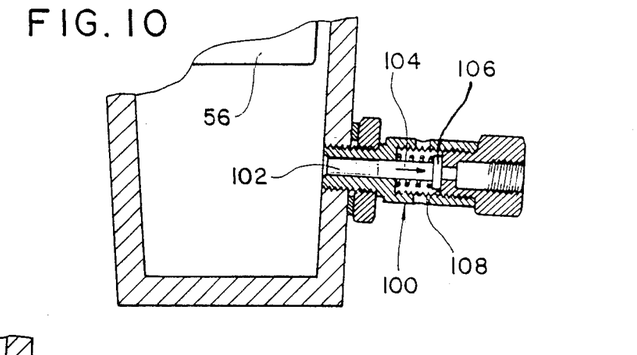
Figure 11:
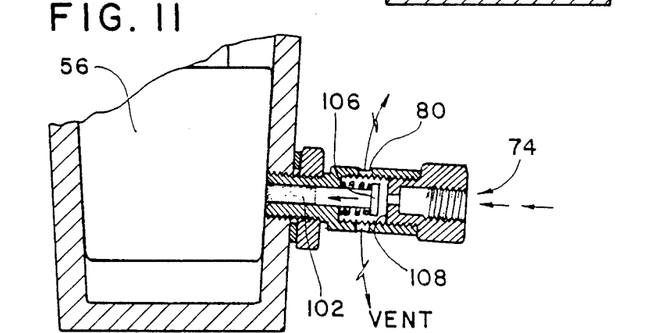

FIGS. 10 and 11 refer to an alternative embodiment of a venting valve in which magnetic attraction is used to actuate the valve. In FIG. 10, the venting valve 100 is illustrated in the closed position, in which a magnetic member 102, which is connected to a valve stem 104 is magnetically biased into a position where a valve 106 is seated over a valve seat 108. The magnetic member is of a type which is used in proximity limit switches, such as the type known as the "70 series" GO brand proximity limit switch which utilizes both reaction forces of magnetic power attraction and repulsion in its operating principles. In the closed position, the position is the result of the attracting force of unlike coils of a primary magnet and a center magnet. This attraction is enhanced by the repelling force of the like poles of the center magnet and a bias magnet. To actuate the valve, a ferrous actuator is moved into position next to the primary magnet (on the left side of the magnetic member in FIG. 10). The magnetic attraction of the primary magnet to the center magnet is weakened, resulting in the movement of the primary magnet towards the ferrous actuator. In the present case, the valve element 56 is the ferrous actuator, so that when the valve element falls into its closed position, the magnetic member 102 moves to the left as shown in FIG. 11. When this occurs, the valve 106 is unseated from the valve seat 108 and air in the line 74 is allowed to vent through the port 80. The primary magnet of the magnetic member is labelled with the north pole "N" closest to the ferrous metal valve element 56.

Figure 12:
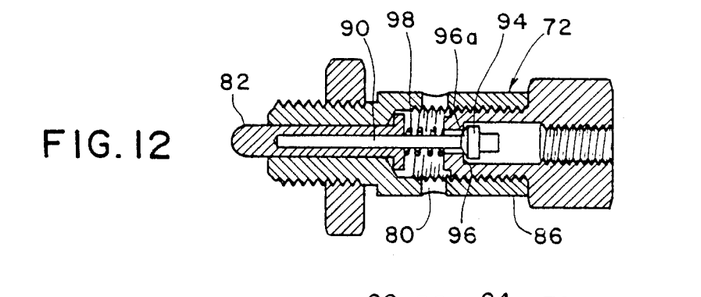
Figure 13:
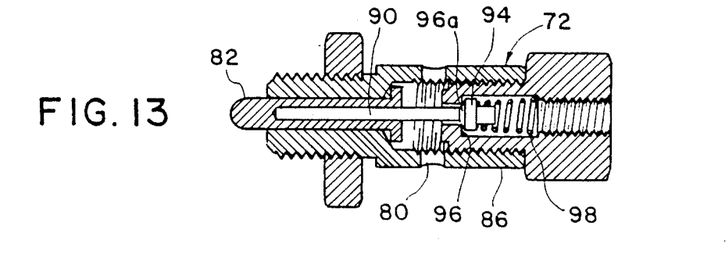

FIGS. 12 and 13 are enlarged views of the venting valve 72 illustrated in FIGS. 6 and 8, respectively.

Figure 14:
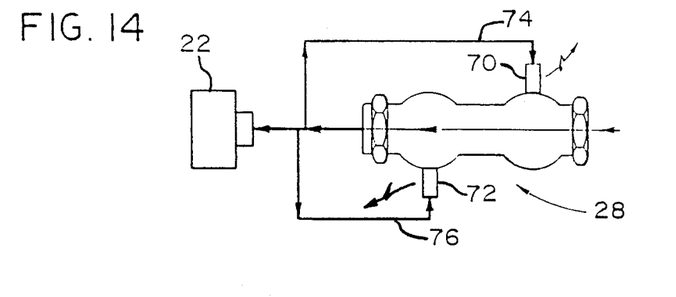
FIG. 14 is a schematic view of the operational features of the valve system of FIGS. 4 through 11.

FIG. 14 is a schematic illustration of how venting occurs in the seismic valve 28 of the embodiment of FIGS. 4 through 11. Basically, 15–20 psi air pressure delivered from the air supply passes through the seismic valve 28 and is delivered to the air switch 22. Air is fed through lines 74 and 76 to venting valves 70 and 72. Under normal conditions, pressurized gas (air) passes through the seismic valve 28 and exerts a positive pressure on the venting valve assembly, including venting valve 70 and 72, thus presenting the possibility that some gas leakage may occur in the venting valve assembly. Over a prolonged period of time, this could exhaust the supply of gas from a bottled source, such as bottled nitrogen, when this type of gas supply is used (as opposed to an air tank and compressor).

Figure 15:
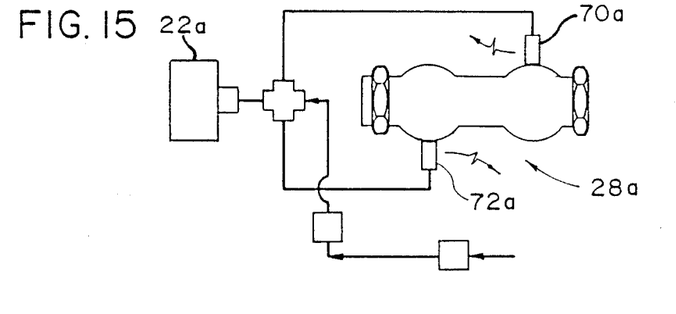
FIG. 15 is a schematic view of a gas actuated valve system according to another embodiment of the present invention.

To meet this possibility, an alternative embodiment is disclosed in FIG. 15, in which the seismic valve 28a is external to the operating gas line and, as a result, pressurized gas does not flow through the gate valves. In the embodiment of FIG. 15, the seismic valve 28a is capped at the ends instead of having the main flow of the pilot system pass therethrough. The venting valves 70a and 72a are thereby only permitted to vent when the gates are in the down position.

Figure 16:
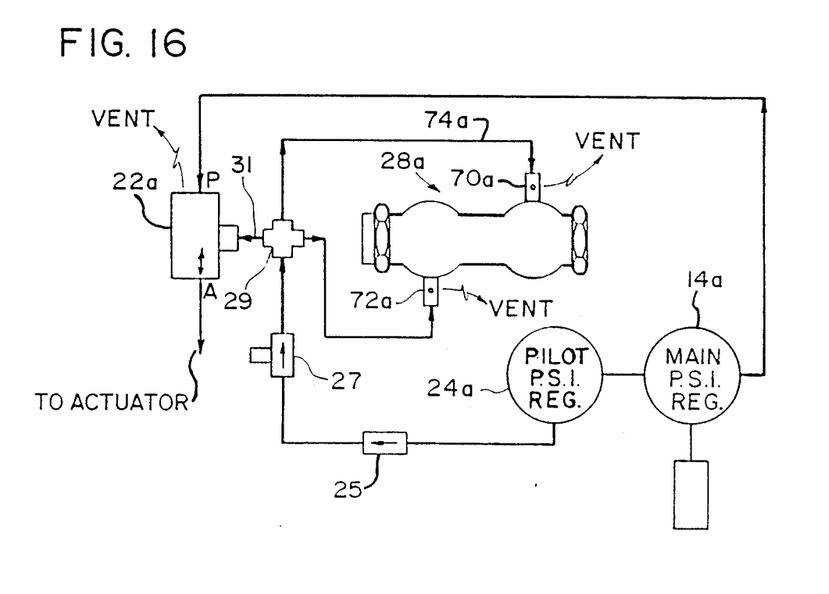
FIG. 16 is a schematic view showing in greater detail the valve system of FIG. 15.

FIG. 16 is a more detailed schematic view of the embodiment of FIG. 15, and is shown to incorporate other aspects of the system, corresponding to FIG. 1. In particular, a supply 12a of compressed gas is fed to a main regulator 14a which feeds pressurized gas to an gas switch 22a directly, and to a pilot regulator 24a. An excess flow valve 25 is provided in order to cut pilot supply off after vent ports open. This aspect of the system is optional. A metering valve 27, such as a needle valve, is provided to cut the flow rate in the pilot line down to a level less than the potential flow rate through the vent holes of the venting valves 70a and 72a. The pilot line is provided with a four-way coupling 29 which allows pressurized gas to be fed to the venting valves through lines 74a and 76a and also to the switch 22a through line 31.

When the pilot pressure is maintained to the switch 22a, the main pressure is allowed to communicate through the switch 22a from port P to port A, whereupon the pressure is delivered to the actuator (not shown). Operation of the embodiment shown in FIGS. 15 and 16 will now be described with reference to FIGS. 17 and 18.

Figure 17:
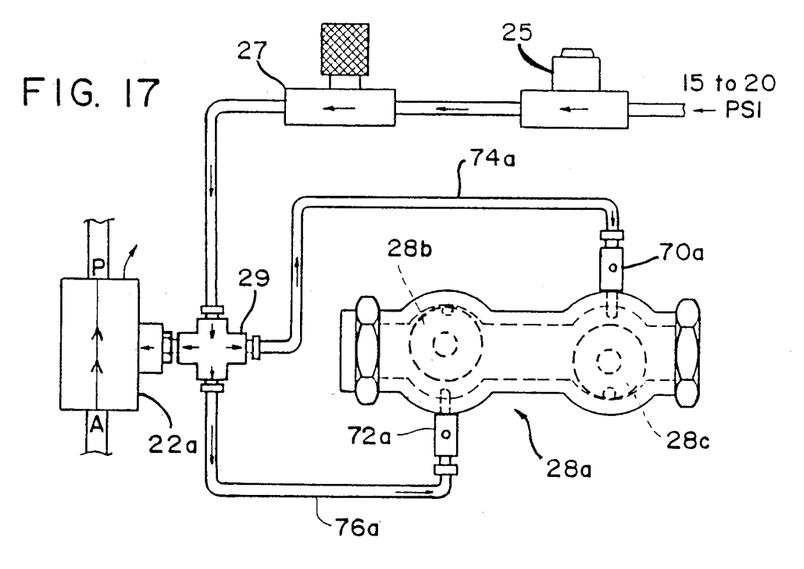
FIGS. 17 and 18 are schematic views showing operation of the valve system of FIG. 15 in the operational position and the seismic shut off position, respectively.
Figure 18:
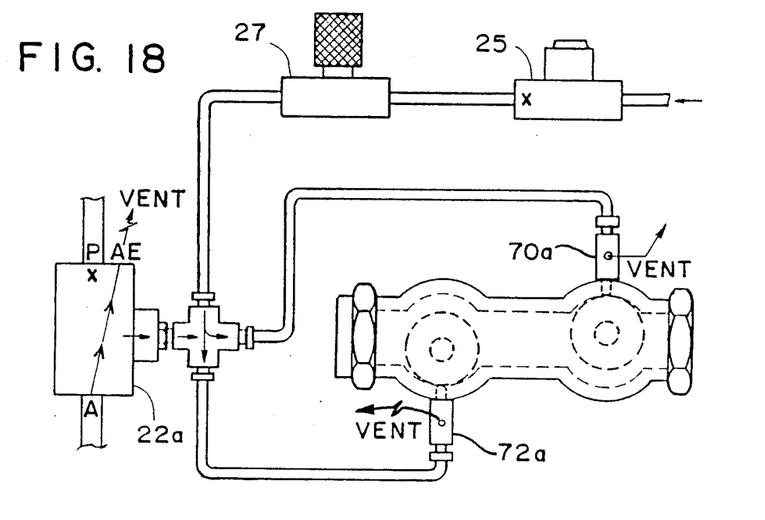

FIGS. 17 and 18 are schematic, but show more detail of the pilot system incorporating the FIG. 14 embodiment. In FIG. 17, the gate valves 28b and 28c of the seismic valve 28a are shown in the up position, whereby the venting valves 70a and 72a are in the closed position. The excess flow valve 25 is in the open position, allowing only static pressure, i.e., no flow. The metering valve 27 is set at a low flow rate, such as lower than the flow rate of the venting valves 70a and 72a. In the operational position of FIG. 17, although the flow rate is set low at the metering valve 27, there is no flow once pressurized gas has filled the lines and has been supplied to the venting valves and to the air switch 22a. In the operational position of FIG. 17, the switch 22a allows pressurized gas to flow from port A through to port P. The pressure supplied in the line to the switch 22a works against a spring which compresses due to the gas pressure.

FIG. 18 illustrates the system when sufficient seismic activity has dislodged the gate elements 28b and/or 28c, thereby opening the vent ports of the venting valves 70a and 72a. In this case, if an excess flow valve 25 is incorporated in the system, flow through the valve 25 will be initiated and if the flow rate exceeds a set trip point, the valve 25 will shut off flow from the pilot regulator (not shown in FIGS. 17 or 18). The shut off of the valve 25 is indicated by the mark "X" at the downstream side of the valve 25.

Once the gates 28b and 28c have actuated the venting valves 70a and 72a, gas flowing through the metering valve 27 flows at a rate less than the rate of flow from the venting valves. Gas in the switch 22a is then reversed and vented from the vent holes of the venting valves. The switch 22a is switched by virtue of the pressure decrease, which enables the spring to return and switch the port P out of communication of the port A (as indicated by the mark "X"), and the main gas flow is vented through a vent AE. In this respect, the valve actuator moves the valve to the closed position. Thus shutting off the flow of fluidic materials such as gases, liquids or fluidized particles.

The embodiment described above (FIG. 15) may use air instead of bottled nitrogen, and thus, the source 12a could be an air compressor and tank. However, bottled gas sources are more suitable for the embodiment of FIG. 15 which minimizes gas leakage.

A gas actuated valve system incorporating the FIG. 15 embodiment would require a simple modification of the secondary, pilot "AIR" circuit illustrated in FIG. 1. All other components of FIG. 1 system could be incorporated in the FIG. 15 embodiment.

Although the invention has been described with respect to particular illustrative embodiments, it will be understood that variations and modifications may be made within the true spirit and scope of the present invention.

What is claimed:

1. A gas actuated valve system for shutting off fluid flow in a fluid conduit, comprising:
   a fluid shut off valve for placement in the fluid conduit;
   a gas driven actuator, connected to the fluid shut off valve for moving the fluid shut off valve between open and closed positions;
   a primary gas circuit, in fluid communication with the gas driven actuator, for supplying gas from a gas source to the gas driven actuator at a pressure sufficient to maintain the fluid shut off valve in the open position;

a gas switch disposed in the primary gas circuit upstream of the gas driven actuator and being movable to an open position when a pilot gas is supplied under pressure to the gas switch through a pilot circuit, and to a closed position when the pilot pressure is released; and seismic means externally coupled to the pilot circuit for sensing seismic activity and releasing pilot gas pressure, thus moving the gas switch to the closed position, when seismic activity is detected.

2. A gas actuated valve system according to claim 1, wherein the seismic means includes venting valve means coupled to the pilot circuit, and seismic actuator means for actuating the venting valve means in accordance with seismic activity.

3. A gas actuated valve system according to claim 2, wherein the seismic actuator means comprises a seismic valve having at least one movable element.

4. A gas actuated valve system according to claim 3, wherein the venting valve means includes at least one venting valve disposed in the pilot circuit and being actuated by seismically induced movement of the movable element.

5. A gas actuated valve system according to claim 1, wherein the gas source is a supply of pressurized nitrogen.

6. A gas actuated valve system according to claim 1, further comprising an excess flow valve disposed in the pilot circuit upstream of the seismic means, for shutting off the flow of pilot gas from the gas source when flow through the excess flow valve exceeds a predetermined limit.

7. A gas actuated valve system according to claim 1, further comprising a metering valve disposed in the pilot circuit upstream of the seismic means for controlling the flow rate of gas from the gas source to the gas switch to a level less than the rate of release of pilot gas from the seismic means.

* * * * *